J. V. LAURENT.
Apparatus for Beveling Glass Plates.
No. 159,518.   Patented Feb. 9, 1875.
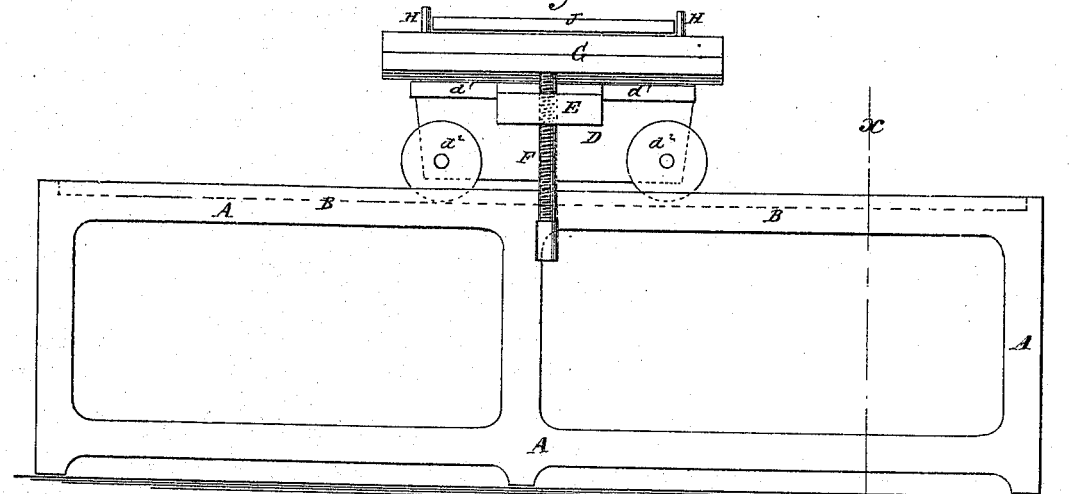
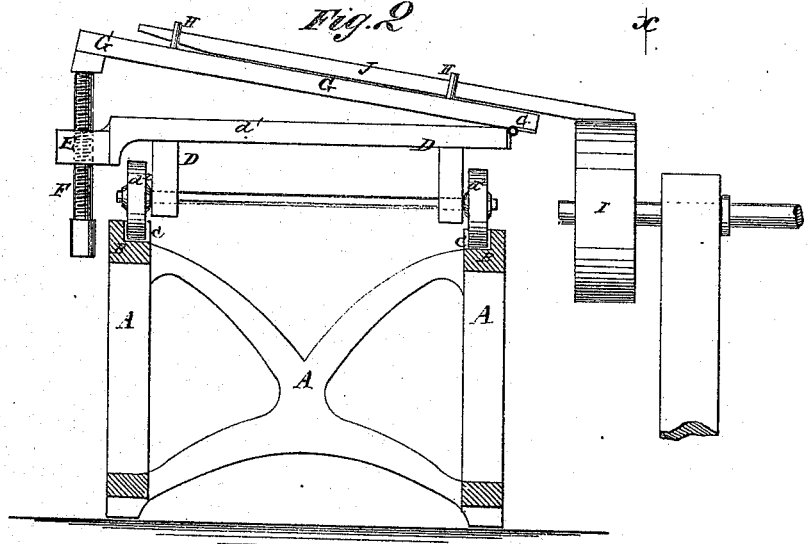
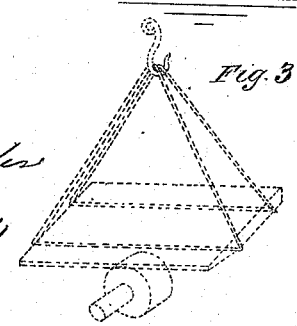
Witnesses:   Inventor:

UNITED STATES PATENT OFFICE.

JEAN VICTOR LAURENT, OF NEW YORK, N. Y.

IMPROVEMENT IN APPARATUS FOR BEVELING GLASS PLATES.

Specification forming part of Letters Patent No. 159,518, dated February 9, 1875; application filed November 14, 1874.

*To all whom it may concern:*

Be it known that I, JEAN VICTOR LAURENT, of the city, county, and State of New York, have invented an Improved Apparatus for Beveling Glass Plates, of which the following is a specification:

The object of my invention is to provide a convenient apparatus for holding, guiding, and inclining plate-glass while grinding its edge to a bevel of any desired angle; and it consists in a truck movable in ways on a frame, and provided with a table, one edge of which is hinged onto the said truck, while the opposite edge can be lowered and elevated, to give to the table any desired inclination, by means of a screw working in a nut or lug formed on or attached to the truck, as will be hereinafter described with reference to the accompanying drawing, in which—

Figure 1 represents a side elevation of my apparatus for beveling plate-glass. Fig. 2 is a cross-section of the same, taken through the line $x\ x$ of Fig. 1. Fig. 3 is a perspective view, representing the mode heretofore used for the same purpose.

Similar letters of reference indicate like parts.

A is the frame of the apparatus. On or in the upper rail, B, of the frame A are ways C, on which the wheels of the truck work, and by which the truck is guided horizontally without any lateral deviation. D is the truck, consisting simply of a platform, $d^1$, mounted on wheels $d^2$. On one of the edges of the platform $d^1$, parallel with the ways C, is a threaded lug, E, in which fits a hand-screw, F, inserted from the under side of the lug and platform. G is the table, the lower side of which rests at one edge on the upper end of the screw F, while at the opposite edge it is hinged to the platform $d^1$ of the truck D, so that by operating the hand-screw F the table G and the glass plate placed thereon may be inclined to any angle desired to bring the edge of the glass plate in such position of contact with a grinding-wheel, I, as to produce the bevel desired on the glass.

The glass plate J is placed on the table between pins or stops H, which, touching two opposite edges situated at right angles to the ways, prevent it from changing position by the force exerted by the grinding, but allow it to yield to the upward pressure of the grinding-wheel, according to the variation of resistance due to inequalities in the glass, whereby cracking of the plate is obviated.

When the glass plate is in the desired position on the table and relative to the grinding-wheel, the grinding and beveling is effected by moving the truck forward and backward on the ways of the frame.

The truck may be moved either automatically or by hand.

Heretofore, as shown in Fig. 3, the plate-glass was suspended by ropes to some fixed point, and was guided by hand by two men, great experience being needed to secure evenness and accuracy of the work in that manner.

Having thus described my invention, what I claim as new, and desire to secure by Letters Patent, is—

For the purpose of beveling plate-glass, the truck D, movable upon ways C, and provided with a hinged table, G, and a screw, F, by which the inclination of the latter is adjusted, all operating substantially as specified.

JEAN VICTOR LAURENT.

Witnesses:
HENRY A. BIGLER,
V. HUYBERY.